June 2, 1964  A. W. CUNNINGHAM  3,135,137
SAFETY MECHANISM FOR PORTABLE ELECTRIC DRILLS
Filed Jan. 14, 1963

INVENTOR

ARTHUR W. CUNNINGHAM

United States Patent Office 3,135,137
Patented June 2, 1964

3,135,137
SAFETY MECHANISM FOR PORTABLE ELECTRIC DRILLS
Arthur W. Cunningham, 1151 Seneca Place, Charlotte, N.C.
Filed Jan. 14, 1963, Ser. No. 251,418
1 Claim. (Cl. 77—7)

This invention relates to improvements in portable electric drills and more particularly to a safety mechanism to prevent dangerous backlash or counterrotation by the drill frame when the drill bit or other chuck held tool jams in the work.

When a portable electric drill is completely stalled, for example when a drill bit binds in its hole, the drill frame will attempt to rotate in the direction opposite to normal chuck rotation until the power to the motor is cut off. If the electric drill has considerable power such as is the case when the size of the drill (chuck capacity) is one-half inch or larger, this opposite rotation or backlash may cause injury to the operator and can be extremely dangerous when the drill must be operated in an awkard or unstable position such as on a ladder or elevated scaffolding.

An object of this invention is to provide a safety mechanism which will instantly counteract any backlash occurring when a chuck held tool is jammed in the work being done.

Another object is to provide a safety mechanism which will be completely automatic in its action and will require no attention or adjustment from the drill operator.

A third object is to provide a safety mechanism which will be an integral part of the drill, completely mechanical in nature and have no connection with the electrical power source or switch.

The above and further objects and advantages of the invention will become clear from a consideration of the following detailed description of one practical form of the invention with reference to the accompanying drawing in which.

Figure 1:
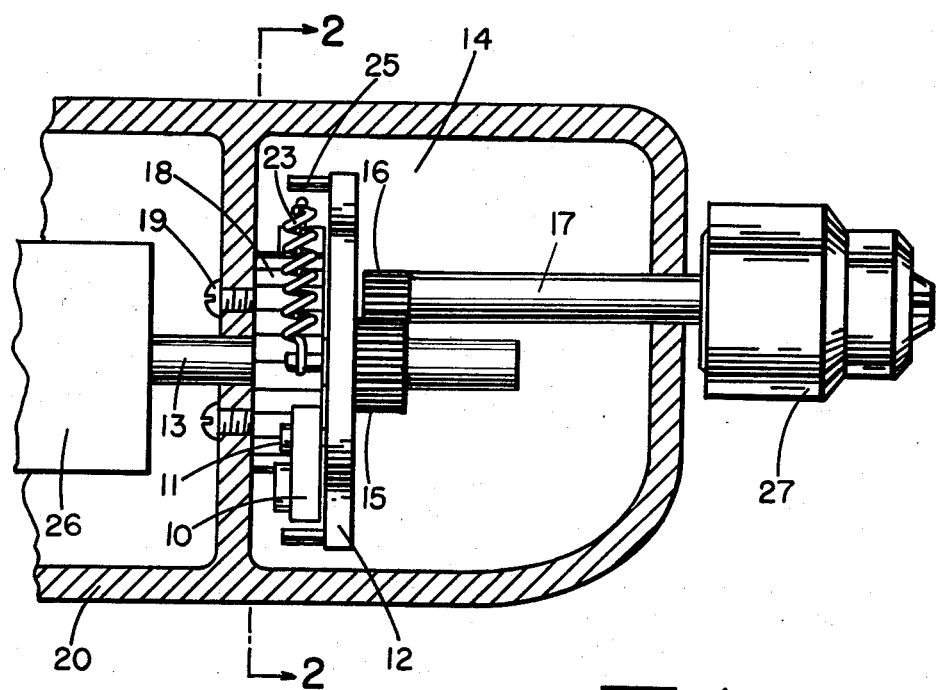
FIGURE 1 is a longitudinal sectional view of the reduction gear section of a typical portable electric drill with one form of my invention shown in position between the motor and the reduction gears.
Figure 2:
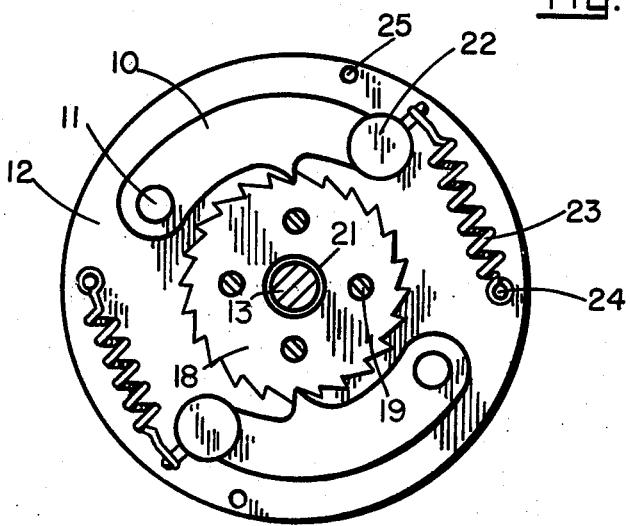
FIGURE 2 is a sectional view taken on line 2—2 of FIGURE 1 showing only the parts included in my invention.

In the drawings ratchet pawls 10 are attached by mounting studs 11 to a pawl carrier 12. This pawl carrier 12 is rotatably mounted on the drill motor shaft 13 on the inside of the reduction gear section 14 of the drill. One the side of pawl carrier 12 opposite to the pawls 10 is fixed a pawl carrier drive spur gear 15. In mesh with this gear is a gear 16, integral with or fixed by suitable means to the chuck spindle 17, which drives the pawl carrier 12 in the proper direction which is opposite to chuck rotation. A ratchet 18 is fixed by screws 19 or other suitable means to the drill frame 20. A hole 21 in the ratchet 18 allows clearance for the motor shaft 13 to extend through the ratchet into the reduction gear section 14 of the drill with no contact. Integral with the pawls 10 are counterweights 22. Pawl springs 23 are mounted by pins 24 between the pawls 10 and pawl carrier 12. The springs 23 are biased so that when the drill is not operating, the pawls 10 are in contact with the teeth of ratchet 18. The counterweights 22 are constructed so that as the drill attains a speed of approximately 10% of full drill speed, centrifugal force is sufficient to overcome the force of springs 23 and the pawls 10 rotate relative to the ratchet 18 without contacting the teeth of the ratchet. Stop pins 25 limit the outward travel of pawls 10. Other parts shown in the drawing are the drill motor 26 and the drill chuck 27 which are according to standard practice and are not included in my invention.

The completely automatic and instantaneous operation of the safety mechanism will be readily understood from the following overall description. When the electrical power is applied to the drill, the ratchet pawls 10 will rotate in contact with the ratchet 18 with the pawls riding up over the teeth of the ratchet, until 10% of full speed is attained by the chuck. At this time the counterweights 22 of the pawls 10 overcome the bias of the springs 23 because of the centrifugal force, which causes the pawls to pivot outwardly and no longer contact the ratchet. At this time the drill will operate in a manner identical with ordinary drills. Should the load on the chuck held tool increase to a point where the chuck speed decreases below 10% of full speed the springs 23 will urge the pawls 10 into contact with the ratchet 18 with the pawls again riding up and over the teeth of the ratchet. If the tool binds in the work, holding the chuck stationary, the pawls 10 will drop into the teeth of the ratchet 18, instantly locking the drill frame to the chuck and preventing the drill frame from rotating in the direction opposite to normal chuck rotation, eliminating possible injury and danger to the drill operator. Note that the chuck is free to rotate in the normal direction at any time and at any speed and that the locking condition is caused only by attempted counterrotation by the drill frame while the chuck is completely stalled.

Having thus described my invention in one practical form thereof what I claim as novel and wish to secure by Letters Patent is as follows:

A safety mechanism for preventing backlash in portable electric motor driven tools having a drive shaft and a driven shaft, and more specifically portable electric drills having a chuck shaft and a motor shaft extending into spaced openings in a frame member, comprising: a ratchet fixed to such frame member; said ratchet having such motor shaft extending axially through a central portion thereof without contacting said ratchet; a rotary pawl carrier mounted on such motor shaft; a gear integral with said pawl carrier; a pinion integral with such chuck shaft; said gear being in meshing engagement with said pinion; said pinion and said gear engagement causing said pawl carrier to rotate in direction opposite to normal chuck shaft rotation; elongated pawls pivotally mounted at end portions thereof on said pawl carrier; counterweights integral with other end portions of said pawls; spring means of predetermined tension connected to said other end portions of said pawls and to said pawl carrier to normally bias said pawls into engagement with said ratchet; said spring means coacting with said pawls to allow said pawls to be thrown out of contact with the teeth of said ratchet at a predetermined low speed of said chuck shaft and to cause said pawls to completely engage the ratchet teeth of said ratchet when said chuck shaft speed drops below said predetermined low speed whereby said chuck shaft becomes locked to such frame to prevent rotation of such frame relative to said chuck shaft in a direction opposite to normal chuck shaft rotation when such chuck shaft is stalled by external forces.

References Cited in the file of this patent
UNITED STATES PATENTS

| | | |
|---|---|---|
| 1,767,593 | Laabs | June 24, 1930 |
| 2,288,135 | Hoza | June 30, 1942 |
| 2,597,785 | Field | May 20, 1952 |
| 3,082,336 | Poole | Mar. 19, 1963 |